United States Patent
Kato et al.

(10) Patent No.: US 10,069,231 B2
(45) Date of Patent: Sep. 4, 2018

(54) CONNECTOR TERMINAL PAIR

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Akihiro Kato, Mie (JP); Yoshifumi Saka, Mie (JP); Takahiro Sunaga, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/541,561

(22) PCT Filed: Dec. 24, 2015

(86) PCT No.: PCT/JP2015/086125
§ 371 (c)(1),
(2) Date: Jul. 5, 2017

(87) PCT Pub. No.: WO2016/111187
PCT Pub. Date: Jul. 14, 2016

(65) Prior Publication Data
US 2017/0352972 A1  Dec. 7, 2017

(30) Foreign Application Priority Data
Jan. 9, 2015  (JP) .................. 2015-003473

(51) Int. Cl.
*H01R 13/03* (2006.01)
*H01H 1/04* (2006.01)
(Continued)

(52) U.S. Cl.
CPC .............. *H01R 13/03* (2013.01); *B32B 15/01* (2013.01); *C22C 9/00* (2013.01); *C23C 30/00* (2013.01);
(Continued)

(58) Field of Classification Search
CPC ... H01R 13/03; B32B 15/01; B32B 2307/528; C22C 5/06; C22C 13/00; C22C 19/03;
(Continued)

(56) References Cited

U.S. PATENT DOCUMENTS 5,839,924 A * 11/1998 Ritson .................. H01R 11/282
439/757
6,215,670 B1 * 4/2001 Khandros ............ B23K 1/0016
257/696
(Continued)

FOREIGN PATENT DOCUMENTS

JP    S51125892 A    11/1976
JP    S59177817 A    10/1984
(Continued)

OTHER PUBLICATIONS

International Search Report for Application No. PCT/JP2015/086125 dated Mar. 29, 2016, 6 pages.
(Continued)

*Primary Examiner* — Gary Paumen
(74) *Attorney, Agent, or Firm* — Reising Ethington, P.C.

(57) ABSTRACT

An electric contact pair includes a first electric contact, and a second electric contact to be brought into electrical contact with the first electric contact. The first electric contact includes a first plating film made of Ag or a Ag alloy on its
(Continued)

outermost surface, and the second electric contact includes a second plating film made of Rh or a Rh alloy on its outermost surface. The first plating film maybe layered on a first conductive base material, the second plating film maybe layered on a second conductive base material, and the first conductive base material and the second conductive base material are made of copper or a copper alloy, or aluminum or an aluminum alloy. A connector terminal pair includes a first terminal including the first electric contact, and a second terminal including the second electric contact.

5 Claims, 3 Drawing Sheets

(51) Int. Cl.
    *B32B 15/01*     (2006.01)
    *C22C 9/00*     (2006.01)
    *C23C 30/00*     (2006.01)
    B60R 16/02     (2006.01)
    B60R 16/03     (2006.01)
    C22C 5/06     (2006.01)
    C22C 19/03     (2006.01)
    C22C 21/00     (2006.01)

(52) U.S. Cl.
    CPC ............ *H01H 1/04* (2013.01); *B60R 16/0207* (2013.01); *B60R 16/03* (2013.01); *C22C 5/06* (2013.01); *C22C 19/03* (2013.01); *C22C 21/00* (2013.01); *H01R 2201/26* (2013.01)

(58) Field of Classification Search
    CPC C22C 28/00; C22C 9/00; C25D 5/505; Y10T 428/12715; Y10T 428/12722; Y10T 428/12472
    USPC .................................................. 439/886, 887
    See application file for complete search history.

(56) References Cited

U.S. PATENT DOCUMENTS

| | | | | |
|---|---|---|---|---|
| 6,770,383 | B2* | 8/2004 | Tanaka | B32B 15/01 427/123 |
| 6,860,769 | B2* | 3/2005 | Liu | C25D 17/005 118/620 |
| 7,628,616 | B2* | 12/2009 | Yoshida | G01R 1/0466 439/66 |
| 8,936,857 | B2* | 1/2015 | Dadvand | B32B 15/018 428/673 |
| 9,979,110 | B2* | 5/2018 | Shibuya | H01R 13/03 |
| 2003/0091855 | A1* | 5/2003 | Tanaka | B32B 15/01 428/647 |
| 2004/0151952 | A1* | 8/2004 | Brady | H01M 8/0206 439/886 |
| 2007/0007497 | A1 | 1/2007 | Miyazawa | |
| 2009/0202861 | A1 | 8/2009 | Mihara | |
| 2014/0329107 | A1* | 11/2014 | Shibuya | B32B 15/01 428/642 |
| 2015/0011132 | A1* | 1/2015 | Shibuya | C25D 5/12 439/887 |
| 2015/0079422 | A1 | 3/2015 | Sunaga | |
| 2015/0147924 | A1* | 5/2015 | Shibuya | C25D 5/10 439/887 |
| 2015/0171537 | A1* | 6/2015 | Shibuya | C25D 5/10 361/773 |
| 2015/0194746 | A1* | 7/2015 | Shibuya | C25D 5/12 439/887 |
| 2015/0213918 | A1* | 7/2015 | Shibuya | C23C 28/021 439/493 |
| 2015/0255906 | A1* | 9/2015 | Shibuya | B32B 15/01 439/887 |
| 2015/0259813 | A1* | 9/2015 | Kodama | C09D 4/00 428/648 |
| 2015/0295333 | A1* | 10/2015 | Shibuya | C25D 5/10 439/887 |
| 2018/0026385 | A1* | 1/2018 | Kato | H01R 13/03 |

FOREIGN PATENT DOCUMENTS

| | | |
|---|---|---|
| JP | 2004190064 A | 7/2004 |
| JP | 2006108057 A | 4/2006 |
| JP | 2008095186 A | 4/2008 |
| JP | 2010146925 A | 7/2010 |
| JP | 2011074499 A | 4/2011 |
| JP | 2011124141 A | 6/2011 |
| JP | 2013231228 A | 11/2013 |
| JP | 2014175196 A | 9/2014 |

OTHER PUBLICATIONS

International Preliminary Report on Patentability for Application No. PCT/JP2015/086125, 16 pages.

* cited by examiner

CONNECTOR TERMINAL PAIR

CROSS REFERENCE TO RELATED APPLICATIONS

This application claims the priority of Japanese patent application JP2015-003473 filed on Jan. 9, 2015, the entire contents of which are incorporated herein.

TECHNICAL FIELD

The present invention relates to a connector terminal pair.

BACKGROUND ART

In recent years, as a result of widespread use of hybrid cars, electric cars and the like, large-current connector terminals are used in power supply lines and the like for supplying power to motors and the like. In connector terminals of this type to be fitted to each other to form a connector terminal pair, a Ag plating film having low contact resistance is generally used in an electric contact of the connector terminals.

For example, Patent Document 1 (JP2013-231228A) discloses a connector terminal including a base material made of Cu or a Cu alloy for forming a terminal, a Ag—Sn alloy plating film with which the surface of the base material is coated, and a Ag plating film with which the Ag—Sn alloy plating film is coated and that is exposed on the outermost surface.

In addition, Patent Document 2 (JP2011-74499A) discloses an electric contact including a composite plating film obtained by incorporating a certain amount of carbon particles into a Ag plating film.

SUMMARY

However, conventional techniques have room for improvement as follows. That is, Ag has relatively high conductivity. Therefore, the contact resistance of an electric contact pair having a configuration in which Ag plating films are brought into electrical contact with each other can be lowered. However, Ag is a relatively soft metal and thus easily causes adhesion. Therefore, the electric contact pair is likely to be worn due to the Ag plating films adhering to each other, and has poor wear resistance. In particular, slide friction applied to the electric contact pair markedly causes wear due to adhesion as mentioned above.

The hardness of the plating film of an electric contact pair can be increased by providing a relatively hard Ag—Sn alloy plating film under a Ag plating film, thus making it possible to reduce the friction coefficient. Therefore, friction in the electric contact pair can be suppressed, improving the wear resistance. However, the Ag plating films are brought into electrical contact with each other in the electric contact pair in the same manner as mentioned above, and therefore, it is difficult to prevent wear due to adhesion between the Ag plating films. Moreover, it is necessary to perform steps of layering a plurality of plating films and performing reflow in order to form the Ag plating film on the Ag—Sn alloy plating film. This results in poor productivity.

When an electric contact pair using composite plating films into which carbon particles have been incorporated is worn, and thus the carbon particles are exposed, there is a risk that the contact resistance is increased. Moreover, since it is necessary to sufficiently incorporate the carbon particles into the plating films, there is a concern that the plating speed is reduced, resulting in poor productivity.

The present design was achieved in view of the above-described background, and provides an electric contact pair that has low contact resistance and high wear resistance and is favorable in terms of productivity, and a connector terminal pair using the electric contact pair.

An aspect of the present design is a connector terminal pair to be used in a wire harness for an automobile, the connector terminal pair including a first terminal having a first electric contact, and a second terminal having a second electric contact to be brought into electrical contact with the first electric contact, wherein the first electric contact includes a first plating film made of Ag or a Ag alloy on its outermost surface, and the second electric contact includes a second plating film made of Rh or a Rh alloy on its outermost surface, and a base plating film made of Ni or a Ni alloy is provided below the first plating film and/or below the second plating film.

With the above connector terminal pair, the electric contact pair is consitituted by the above first electric contact of the first terminal and the above second electric contact of the second terminal. In the above electric contact pair, the first plating film made of Ag or a Ag alloy in the first electric contact and the second plating film made of Rh or a Rh alloy in the second electric contact are brought into electrical contact with each other. Ag and Rh have relatively high conductivity. Therefore, with the above electric contact pair, low contact resistance can be realized.

There is no contact between Ag plating films in the above electric contact pair. In addition, Ag and Rh hardly form an alloy. Therefore, in the above electric contact pair, strong adhesion as observed in an electric contact pair in which Ag plating films are brought into electrical contact with each other does not occur. For this reason, with the above electric contact pair, wear due to the adhesion between the first plating film and the second plating film can be suppressed. Furthermore, Rh is harder than Ag. This makes it possible to suppress wear. Therefore, the above electric contact pair can exhibit high wear resistance due to the combination of two effects, namely the effect of using optimal plating film materials in combination and the effect of selecting Rh, which is relatively hard.

With the above electric contact pair, unlike in conventional techniques, when the plating film on the outermost surface of each electric contact is formed, it is not necessary to layer a plurality of plating films and perform reflow processing or to precipitate carbon particles in a plating film, and it is sufficient if ordinary plating is performed. This makes it possible to simplify the plating process during the manufacturing of the above electric contact pair and to make the plating speed relatively fast. Therefore, the above electric contact pair is favorable in terms of productivity.

Accordingly, with the present design, a connector terminal pair including an electric contact pair that has low contact resistance and high wear resistance and is favorable in terms of productivity can be obtained.

DESCRIPTION OF EMBODIMENTS

Figure 1:
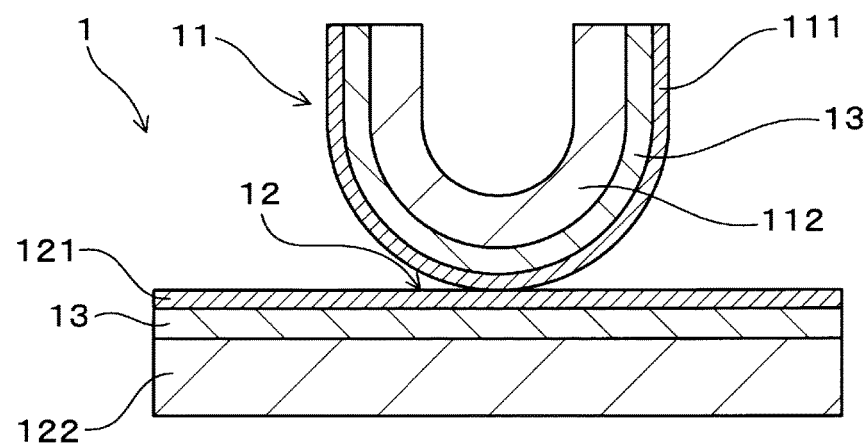
FIG. 1 is a schematic cross-sectional view of an electric contact pair of a connector terminal pair of Example 1.

In the above connector terminal pair, the above electric contact pair may have a configuration in which a first plating film is layered on a first conductive base material, a second plating film is layered on a second conductive base material, and the first conductive base material and the second conductive base material are made of copper or a copper alloy, or aluminum or an aluminum alloy.

In this case, an electric contact pair that is suitable for a connector terminal pair using copper or a copper alloy, or aluminum or an aluminum alloy as a conductive base material is obtained.

It should be noted that it is sufficient if the first plating film is arranged above the first conductive base material, and the second plating film is arranged above the second conductive base material. Accordingly, the first plating film may not be in contact with the first conductive base material or may be in contact with the first conductive base material. In the former case, another plating film may be interposed between the first conductive base material and the first plating film as needed. Similarly, the second plating film may not be in contact with the second conductive base material or may be in contact with the second conductive base material. In the former case, another plating film may be interposed between the second conductive base material and the second plating film as needed.

In the above connector terminal pair, the above electric contact pair includes a base plating film made of Ni or a Ni alloy below the first plating film and/or below the second plating film.

The base plating film made of Ni or a Ni alloy has high thermal resistance. Therefore, with this configuration, even when the above electric contact pair is exposed to a high-temperature environment, the base plating film can block oxide-forming elements (e.g., the Cu component of the conductive base material used in the connector terminal pair) that diffuse toward the surface of the first plating film or the second plating film from below the base plating film. This makes it less likely that insulating oxides are formed on the surface of the first plating film or the second plating film, and thus an increase in contact resistance can be easily suppressed.

Specifically, in the above connector terminal pair, the first electric contact may have a configuration in which an optional base plating layer and the first plating film are layered in this order on the surface of the first conductive base material. Moreover, specifically, the second electric contact may have a configuration in which an optional base plating layer and the second plating film are layered in this order on the surface of the second conductive base material.

The above connector terminal pair may have a configuration in which the thickness of the second plating film is smaller than that of the first plating film. In this case, there is an advantage in that the coating weight of the second plating film is reduced, leading to a reduction in cost and the like.

It is preferable that the friction coefficient between the first plating film and the second plating film in the above connector terminal pair is not more than half of the friction coefficient between Ag plating films. In this case, it becomes easy to obtain an electric contact pair having high wear resistance.

It should be noted that the friction coefficient between Ag plating films can be measured using an electric contact pair having a configuration in which a Ag plating film is used as the first plating film of the first electric contact, and the same Ag plating film as the above Ag plating film is used as the second plating film of the second electric contact. A method of measuring the friction coefficient will be described later.

The above connector terminal pair may have a configuration in which the first electric contact has a projection shape, and the second electric contact has a plate shape to be brought into electrical contact with the apex of the projection-shaped first electric contact. Alternatively, a configuration in which the second electric contact has a projection shape, and the first electric contact has a plate shape that comes into electrical contact with the apex of the projection-shaped second electric contact is also possible.

In the above connector terminal pair, the first terminal may have a female-terminal shape having a projecting portion, and the second terminal may have a male-terminal shape having a plate-shaped portion to be brought into contact with the apex of the projecting portion. Also, the second terminal may have a female-terminal shape having a projecting portion, and the first terminal may have a male-terminal shape having a plate-shaped portion to be brought into contact with the apex of the projecting portion.

It should be noted that the above-described configurations can be used in combination as desired in order to obtain the above-described functions and effects.

EXAMPLES

Hereinafter, connector terminal pairs of examples will be described using the drawings. It should be noted that the same members are denoted by the same reference numerals in the descriptions.

Example 1

A connector terminal pair of Example 1 will be described using FIGS. 1 and 2. As shown in FIG. 1, an electric contact pair 1 includes a first electric contact 11 and a second electric contact 12 to be brought into electrical contact with the first electric contact 11. The first electric contact 11 includes a first plating film 111 made of Ag or a Ag alloy on its outermost surface. The second electric contact 12 includes a second plating film 121 made of Rh or a Rh alloy on its outermost surface. Hereinafter, this will be described in detail.

Specifically, in this example, the first electric contact 11 has a projection shape. The second electric contact 12 has a plate shape that is brought into electrical contact with the apex of the projection-shaped first electric contact 11. More specifically, the first electric contact 11 includes a projection-shaped first conductive base material 112, a base plating film 13 layered on the surface of the first conductive base material 112, and the first plating film 111 layered on the surface of the base plating film 13. The second electric contact 12 includes a plate-shaped second conductive base material 122, a base plating film 13 layered on the surface of the second conductive base material 122, and the second plating film 121 layered on the surface of the base plating film 13.

In this example, the first conductive base material 112 and the second conductive base material 122 are made of copper or a copper alloy. The base plating film 13 is made of Ni or a Ni alloy. The first conductive base material 112 has a thickness of 250 µm. The second conductive base material 122 has a thickness of 250 µm. The base plating film 13 formed on the surface of the first conductive base material 112 has a thickness of 1 µm. The base plating film 13 formed on the surface of the second conductive base material 122 has a thickness of 1 µm. The first plating film 111 has a thickness of 5 µm. The second plating film 121 has a thickness of 0.3 µm.

Figure 2:
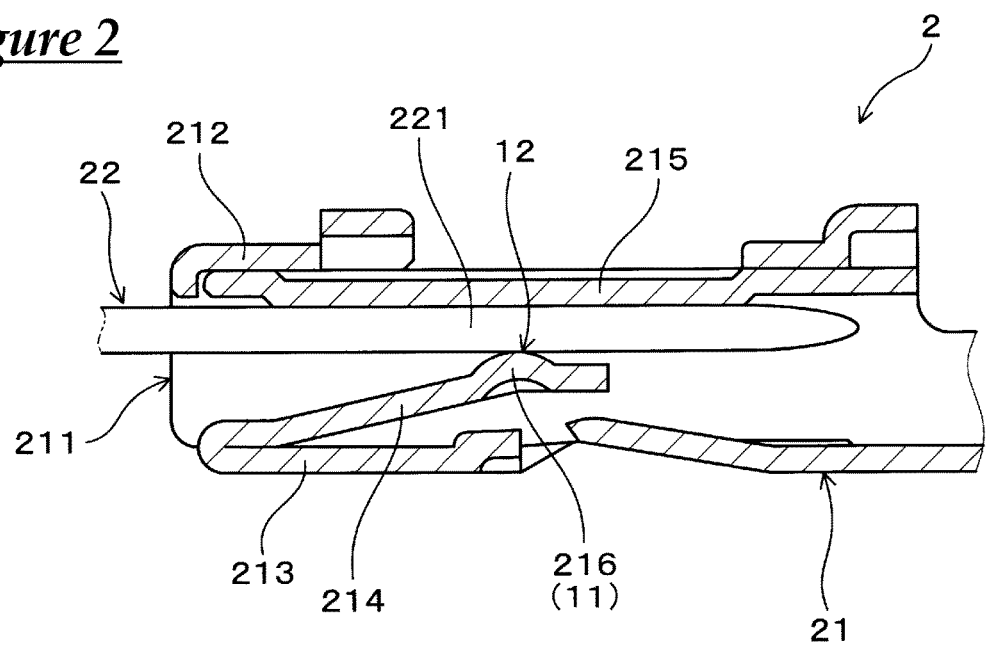
FIG. 2 is a schematic cross-sectional view of a connector terminal pair of Example 1.

Next, as shown in FIG. 2, the connector terminal pair 2 of this example includes a first terminal 21 and a second terminal 22. The first terminal 21 includes the above first electric contact 11. The second terminal 22 includes the above second electric contact 12. Hereinafter, this will be described in detail.

In this example, the connector terminal pair 2 is to be used in a wire harness (not shown) for an automobile. More specifically, the connector terminal pair 2 is to be used in a power supply line through which a large current can flow in an automobile. Specifically, the first terminal 21 is a female terminal. Specifically, the second terminal 22 is a male terminal.

The first terminal 21 includes a tubular portion 212 in which an insertion opening 211 is open at a front end. On the other hand, the second terminal 22 has a plate-shaped portion 221 to be inserted into the insertion opening 211 of the first terminal 21. An elastic contact piece 214 that is formed by folding over a bottom plate 213 toward the interior rear side is provided inside the tubular portion 212 of the first terminal 21. The elastic contact piece 214 is provided to apply an upward force on the plate-shaped portion 221 of the inserted second terminal 22. The plate-shaped portion 221 of the second terminal 22 is pressed to the inner surface of a top plate 215 of the tubular portion 212 by the elastic contact piece 214. Accordingly, the plate-shaped portion 221 of the second terminal 22 is held between the elastic contact piece 214 and the inner surface of the top plate 215 in a clamped state.

The elastic contact piece 214 is provided with a projecting portion 216. The projecting portion 216 is formed by causing the elastic contact piece 214 to bulge out toward the surface from the back side in a hemispherical shape. In this example, the projecting portion 216 of the elastic contact piece 214 serves as the first electric contact 11. A portion that comes into contact with the apex of the projecting portion 216 and a portion around this portion in the plate-shaped portion 221 of the second terminal 22 serve as the second electric contact 12.

It should be noted that, in this example, the surface of the conductive base material made of copper or a copper alloy is coated with the base plating film constituted by a plating film made of Ni or a Ni alloy, and the surface of the base plating film is coated with a plating film made of Sn or a Sn alloy in a portion of the first terminal 21 other than the elastic contact piece 214 including the first electric contact 11. It should be noted that the conductive base material constituting the first terminal 21 is continuous with the first conductive base material 112 of the first electric contact 11. Moreover, the surface of the conductive base material made of copper or a copper alloy is coated with the base plating film constituted by a plating film made of Ni or a Ni alloy, and the surface of the base plating film is coated with a plating film made of Sn or a Sn alloy in a portion (not shown) of the second terminal 22 other than the plate-shaped portion 221 including the second electric contact 12. It should be noted that the conductive base material constitut-ing the second terminal 22 is continuous with the second conductive base material 122 of the second electric contact 12.

Next, the functions and effects of the connector terminal pair of this example will be described.

In the electric contact pair 1, the first plating film 111 made of Ag or a Ag alloy in the first electric contact 11 and the second plating film 121 made of Rh or a Rh alloy in the second electric contact 12 are brought into electrical contact with each other. Ag and Rh have relatively high conductivity. Therefore, with the electric contact pair 1 of this example, low contact resistance can be realized.

There is no contact between Ag plating films in the electric contact pair 1. In addition, Ag and Rh hardly form an alloy. Therefore, in the electric contact pair 1, strong adhesion as observed in an electric contact pair in which Ag plating films are brought into electrical contact with each other does not occur. For this reason, with the electric contact pair 1, wear due to the adhesion between the first plating film 111 and the second plating film 121 can be suppressed. Furthermore, Rh is harder than Ag. This makes it possible to suppress wear. Therefore, the electric contact pair 1 can exhibit high wear resistance due to the combination of two effects, namely the effect of using optimal plating film materials in combination and the effect of selecting Rh, which is relatively hard.

With the electric contact pair 1, unlike in conventional techniques, when the plating films 111 and 121 on the outermost surfaces of the electric contacts 11 and 12 are formed, it is not necessary to layer a plurality of plating films and perform reflow processing or to precipitate carbon particles in a plating film, and it is sufficient if ordinary plating is performed. This makes it possible to simplify the plating process during the manufacturing of the electric contact pair 1 and to make the plating speed relatively fast. Therefore, the electric contact pair 1 is favorable in terms of productivity.

With the connector terminal pair 2 of this example, the electric contact pair 1 can be constituted by the above first electric contact 11 of the first terminal 21 and the above second electric contact 12 of the second terminal 22.

Example 2

Figure 3:
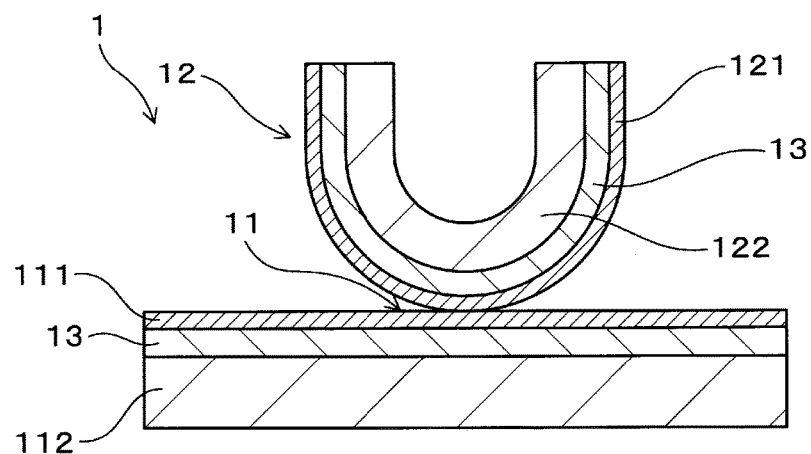
FIG. 3 is a schematic cross-sectional view of an electric contact pair of a connector terminal pair of Example 2.

A connector terminal pair of Example 2 will be described using FIG. 3. As shown in FIG. 3, in an electric contact pair 1, a second electric contact 12 has a projection shape. A first electric contact 11 has a plate shape to be brought into electrical contact with the apex of the projection-shaped second electric contact 12. More specifically, the second electric contact 12 includes a projection-shaped second conductive base material 122, a base plating film 13 layered on the surface of the second conductive base material 122, and a second plating film 121 layered on the surface of the base plating film 13. The first electric contact 11 includes a plate-shaped first conductive base material 112, a base plating film 13 layered on the surface of the first conductive base material 112, and a first plating film 111 layered on the surface of the base plating film 13. Regarding other structural aspects, the explanations of the electric contact pair 1 shown in Example 1 apply also here.

In a connector terminal pair (not shown) of this example, the first terminal is a male terminal, and the second terminal is a female terminal. That is, the male-female configuration of the connector terminal pair of this example is inverted compared with that of Example 1. Therefore, in this example, the projecting portion of the elastic contact piece serves as the second electric contact. A portion that comes into contact with the apex of the projecting portion and a portion around this portion in the plate-shaped portion of the first terminal serve as the first electric contact. Regarding other structural aspects, the explanations of the connector terminal pair of Example 1 apply also here.

The connector terminal pair of this example can also exhibit the same functions and effects as the the connector terminal pair of Example 1.

Experimental Examples

The following are specific descriptions by way of experimental examples.

Production Of Samples

As a base plating film, a Ni plating film having a thickness of 1 μm was formed on the surface of a clean copper plate by electrolytic plating. Next, a Ag plating film having a thickness of 5 μm was formed on the surface of this Ni plating film by electrolytic plating. Sample 1 was thus obtained.

As a base plating film, a Ni plating film having a thickness of 1 μm was formed on the surface of a clean copper plate by electrolytic plating. Next, a Rh plating film having a thickness of 0.3 μm was formed on the surface of this Ni plating film by electrolytic plating. Then, a substantially hemispherical projecting portion was formed by causing a portion of this copper plate to bulge out toward the front side from the back side with a radius of curvature of 3 mm. Sample 2 was thus obtained.

As a base plating film, a Ni plating film having a thickness of 1 μm was formed on the surface of a clean copper plate by electrolytic plating. Next, a Ag plating film having a thickness of 5 μm was formed on the surface of this Ni plating film by electrolytic plating. Then, a substantially hemispherical projecting portion was formed by causing a portion of this copper plate to bulge out toward the front side from the back side with a radius of curvature of 3 mm. Sample 3 was thus obtained.

Measurement of Contact Resistance and Friction Coefficient During Sliding

Plate-shaped Sample 1 including the Ag plating film on the outermost surface and Sample 2 provided with the projecting portion including the Rh plating film on the outermost surface were held in a state in which the apex of the projecting portion of Sample 2 was in contact with the Ag plating film of Sample 1 in a vertical direction, and were caused to slide relative to each other by using a piezo actuator to pull Sample 2 at a speed of 10 mm/min in a horizontal direction and reciprocate it repeatedly within a distance of 7 mm while a load of 5 N was applied in the vertical direction. While sliding was performed repeatedly, the contact resistance between the samples was measured using a four-terminal method. At this time, the open voltage was set to 20 mV, and the flowing current was set to 10 mA. Simultaneously with this measurement, dynamic frictional force acting on the contact portion where the samples were in contact was measured using a load cell. The value obtained by dividing the dynamic frictional force with the load was taken as a friction coefficient. The above sliding was performed while the reciprocating motion was repeated 25 times. Therefore, the sliding distance in this testing was as follows: 14 mm of distance per sliding×25 times of reciprocating motion=350 mm. These measurements were performed at room temperature.

The contact resistance and the friction coefficient during sliding were measured in the same manner as described above, except that plate-shaped Sample 1 including the Ag plating film on the outermost surface and Sample 3 provided with the projecting portion including the Ag plating film on the outermost surface were used.

It should be noted that the above contact resistance and friction coefficient were calculated from average values per sliding in order to eliminate the influence of noise.

The result of the above measurements was that the contact resistance between the pair of Sample 1 and Sample 2 was 0.3 to 0.4 mΩ, and the friction coefficient was 0.3 to 0.4. On the other hand, the contact resistance between the pair of Sample 1 and Sample 3 was 0.2 to 0.3 mΩ, and the friction coefficient was about 1.0.

Observation of Wear Track After Sliding Friction Testing

Figure 5:
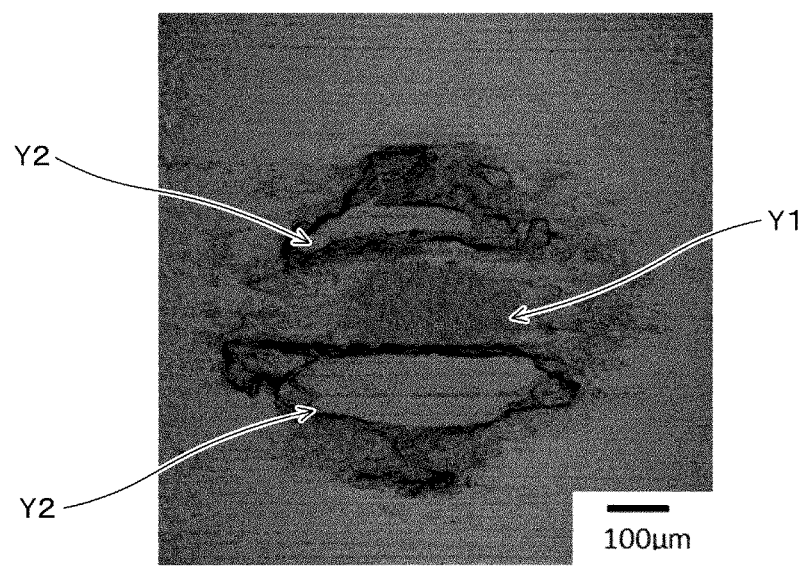
FIG. 5 is a photograph of an apex of a projecting portion in Sample 3 (Ag plating film) of an experimental example after sliding friction testing, as viewed from above.

As shown in FIG. 5, when the pair of plate-shaped Sample 1 including the Ag plating film on the outermost surface and Sample 3 provided with the projecting portion including the Ag plating film on the outermost surface were used, the Ag plating films adhered to each other due to sliding, and the base plating film was exposed. It should be noted that Y1 indicates the exposed base plating film in FIG. 5. Y2 indicates a portion that is dug up due to the adhesion between the Ag plating films and thus bulges out.

Figure 4:
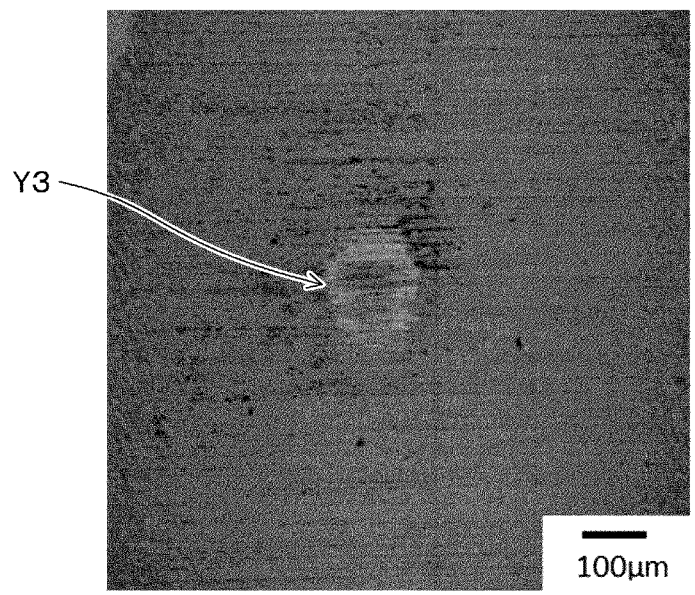
FIG. 4 is a photograph of an apex of a projecting portion in Sample 2 (Rh plating film) of an experimental example after sliding friction testing, as viewed from above.

In contrast, as shown in FIG. 4, when the pair of plate-shaped Sample 1 including the Ag plating film on the outermost surface and Sample 2 provided with the projecting portion including the Rh plating film on the outermost surface were used, a scar (portion indicated by Y3) formed through rubbing due to sliding was observed. However, the base plating film was not exposed on this portion. No wear due to adhesion between the Ag plating film and the Rh plating film was observed.

It can be said from the above results that an electric contact pair having low contact resistance and high wear resistance can be obtained by configuring the electric contact pair using the first electric contact including the first plating film made of Ag or a Ag alloy on the outermost surface and the second electric contact including the second plating film made of Rh or a Rh alloy on the outermost surface in combination. The first plating film and the second plating film each are a single layer and thus can be formed relatively easily. Therefore, it can also be said that the electric contact pair is excellent in terms of productivity.

Although examples of the present invention have been described in detail, the present invention is not limited to the above examples, and it will be appreciated that various modifications can be made without impairing the gist of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A connector terminal pair to be used in a wire harness for an automobile, comprising:
    a first terminal having a first electric contact, and a second terminal having a second electric contact to be brought into electrical contact with the first electric contact,
    wherein the first electric contact comprises a first conductive base material, a first base plating film made of Ni or a Ni alloy layered on a surface of the first conductive base material, and a first plating film made of Ag or a Ag alloy on its outermost surface and layered on a surface of the first base plating film, and
    wherein the second electric contact comprises a second conductive base material, a second base plating film made of Ni or a Ni alloy layered on a surface of the second conductive base material, and a second plating film made of Rh or a Rh alloy on its outermost surface and layered on a surface of the second base plating film.

2. The connector terminal pair according to claim 1, wherein the second plating film has a smaller thickness than that of the first plating film.

3. The connector terminal pair according to claim 1
    wherein the first plating film is layered on a first conductive base material,
    the second plating film is layered on a second conductive base material, and
    the first conductive base material and the second conductive base material are made of copper or a copper alloy, or aluminum or an aluminum alloy.

4. The connector terminal pair according to claim 1, wherein a friction coefficient between the first plating film and the second plating film is not more than half of a friction coefficient between Ag plating films.

5. The connector terminal pair according to claim 1, wherein the first plating film is made of Ag and the second plating film is made of Rh.

* * * * *